Figure 1:
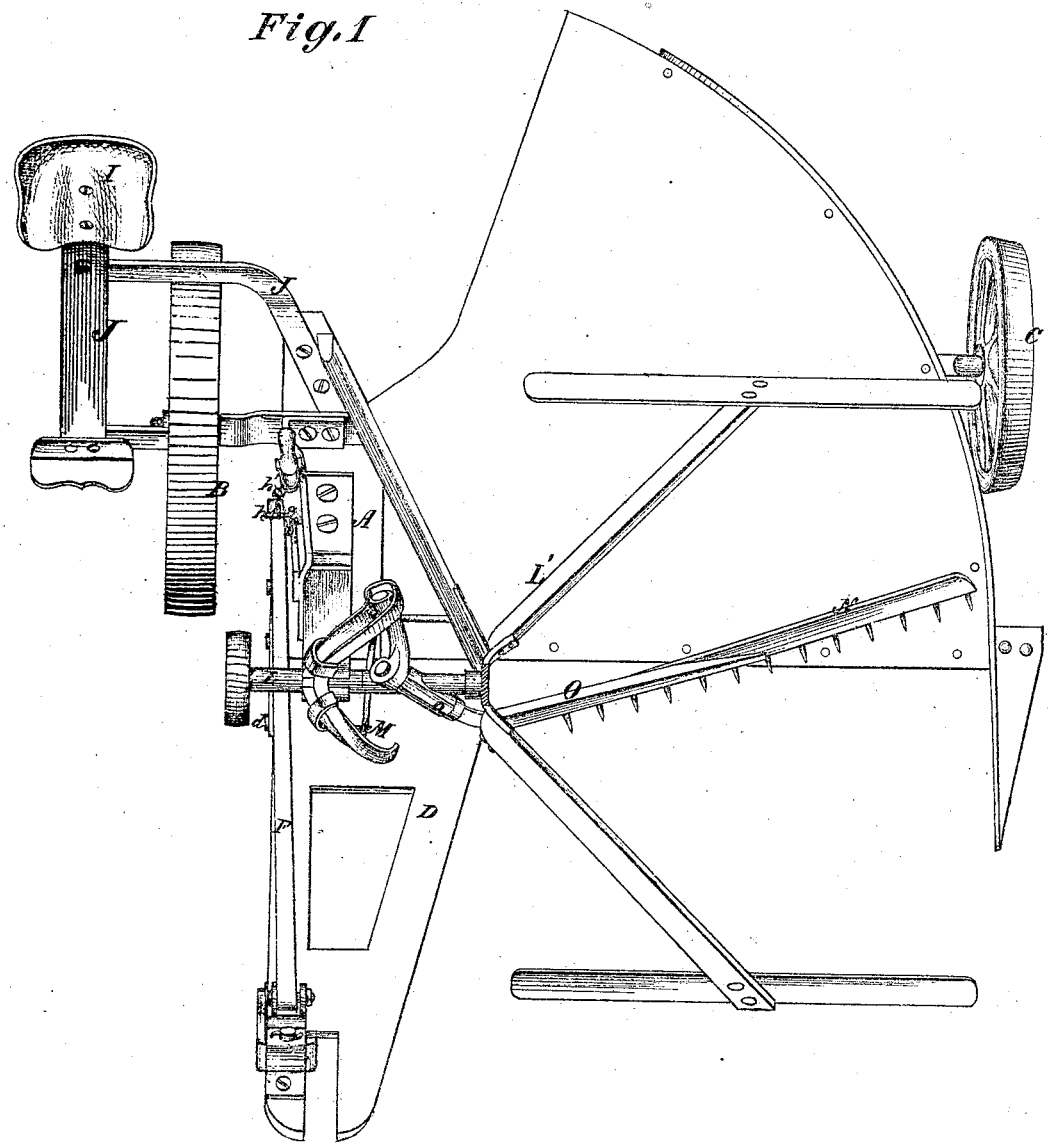

JOHN BARNES.
Improvement in Harvesters.

No. 114,747.

2 Sheets--Sheet 1.

Patented May 16, 1871.

Witnesses:—
Wm H. Rowe
Joel Peyton

Inventor:—
John Barnes
by his Atty
Wm D. Baldwin

JOHN BARNES.
Improvement in Harvesters.
No. 114,747. Patented May 16, 1871.
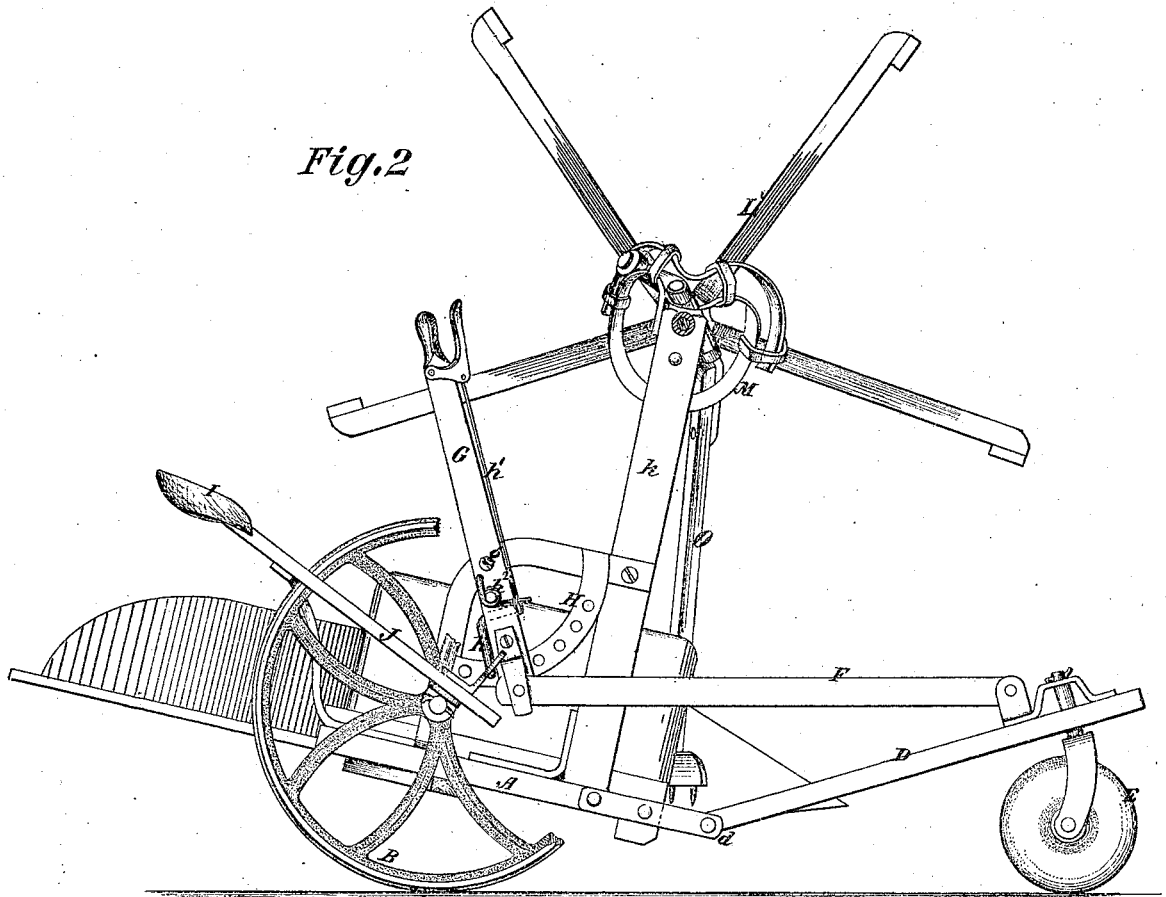
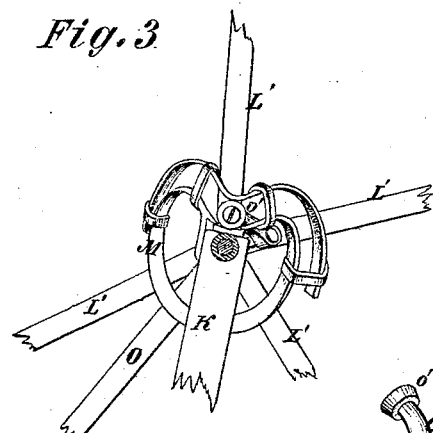
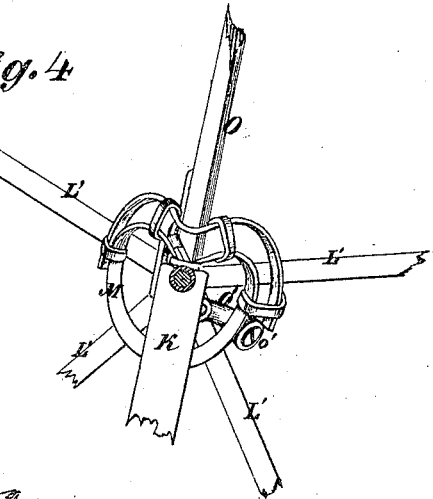
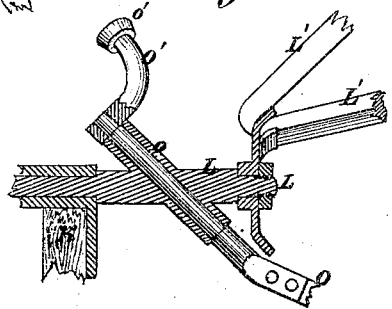
Witnesses:
Wm H. Rowe
Joel Peyton
Inventor:—
John Barnes
by his Atty
Wm D. Baldwin

UNITED STATES PATENT OFFICE.

JOHN BARNES, OF ROCKFORD, ILLINOIS.

IMPROVEMENT IN HARVESTERS.

Specification forming part of Letters Patent No. 114,747, dated May 16, 1871.

*To all whom it may concern:*

Be it known that I, JOHN BARNES, of Rockford, in the county of Winnebago and State of Illinois, have invented certain new and useful Improvements in Harvesters and Harvester-Rakes, of which the following is a specification:

My invention constitutes an improvement on rakes of the class patented by me December 10, 1867; and the invention consists in combining a rake rotating around its shaft, oscillating on an axis inclined to and intersecting that of said shaft, with a crank-arm attached directly to the rake-arm and controlled by a cam, as hereinafter set forth.

In the accompanying drawings, Figure 1 represents a plan of so much of a harvester to which my improvements are applied as is necessary to illustrate my invention, showing the rake as just beginning to sweep the platform; Fig. 2, a side elevation of the same, showing the parts in the same position as in Fig. 1; Fig. 3, a view of the cam, rake, and reel-arms, showing the attitude assumed by the parts as the gavel is discharged; Fig. 4, a similar view, showing the rake at its greatest elevation; and Fig. 5, a vertical longitudinal section through the rake-shaft.

A suitable main frame, A, is mounted upon two wheels, B C. The front of this frame is hinged at $d$, near the line of the cutting apparatus, to a perch or reach, D, supported on a caster-wheel, E. A link, F, pivoted to the perch, extends backward to the main frame, and is pivoted to a hand-lever, G, oscillating on a pivot, $g$, on the frame. A double-cranked arm, $h$, rocks in bearings in this lever, one of these cranks being attached to a link, $h^1$, operated by the driver, and the other taking into one of a series of holes on the rack-bar H, to lock the lever in any position desired. A spring, $h^2$, on the lever tends to keep the crank-arm always in its hole. The frame can thus readily be rocked on its axle to raise or lower the cutting apparatus. A seat, I, for the driver is mounted on a skeleton-frame, J, outside of and behind the driving-wheel, where the driver is out of the way of the rake, and his weight tends to counterbalance that of the cutting apparatus and rake. A standard, K, is erected near the inner front corner of the frame to sustain the reel and rake. The shaft L of an overhung reel of well-known construction revolves in bearings on this standard, and a cam, M, is likewise mounted on this post. A rake, N, is mounted on an arm, O, the upper end of which oscillates in a bearing, $o$, on the shaft L, and passes directly through the shaft, to which it is inclined at an acute angle. A crank, O′, on the upper end of the rake arm or handle carries a friction-roller, $o'$, which traverses the cam M, as hereinafter explained, and guides the rake. This cam is of the peculiar form shown in the drawings, its lower part being vertical, while the upper part is deflected horizontally toward the gearing side of the machine.

In operation, the shaft L is rotated in any proper well-known way. The reel-beaters gather the standing grain back to the cutters, and deposit the cut grain upon the platform in the usual way. In Figs. 1 and 2 the rake is shown as just beginning to sweep over the platform, in which position the roller $o'$ on the crank of the rake-arm is just entering the double or horizontally-deflected part of the cam. The curve of the cam from this point to one vertically over the axis is such as to cause the rake to turn horizontally without ceasing its backward movement, and thus to give the rake a longer sweep than if its rotary movement ceased while its horizontal turning movement was being effected. This peculiarity renders my improved rake peculiarly adaptable to a front-cut machine, in which the gavel must necessarily be swept over a much larger surface than in a rear-cut machine. When the rake has completed the discharge of the gavel, it stands nearly at a right angle with the shaft L, and the friction-roller rests on that portion of the cam nearest the axis of the shaft L, as in Fig. 3. As the rake rises in recommencing its forward movement, it is turned inward to the path of the reel by the divergence of the roller $o'$ from the shaft L, as shown in Fig. 4, in which the rake-arm is nearly vertical. While the rake is descending upon the platform, the roller runs on the vertical lower portion of the cam, and the rake describes a path nearly concentric with that of the reel, but of larger radius, and repeats the movements hereinbefore described As the main frame rocks upon its axis, and as the rake-post is mounted on the front part of the frame, it follows that as the cutting apparatus is lowered for short grain the rake-post is inclined forward, and the rake thus thrown farther forward and downward into the grain, and when the cutting apparatus is raised, a reverse movement takes place, thus obviating the necessity of a separate adjustment of the rake.

I claim as my invention—

1. The combination of the continuously-rotating shaft L, the oscillating rake-handle passing through said shaft at an acute angle thereto, the crank-arm on the rake-handle, and the cam, all these members being constructed and operating as described.

2. The combination of the double-cranked arm rocking in the lever-handle, its link $h^1$, spring $h^2$, and rack H, all constructed and operating as described.

In testimony whereof I have hereunto subscribed my name.

JOHN BARNES.

Witnesses:
 JOHN HOLLISTER,
 J. G. MANLOVE.